(12) United States Patent
Chino et al.

(10) Patent No.: US 12,452,541 B2
(45) Date of Patent: Oct. 21, 2025

(54) INFORMATION PROCESSING APPARATUS, IMAGING APPARATUS, METHOD, AND STORAGE MEDIUM FOR DETERMINING EXPOSURE APPROPRIATE FOR PARTIAL DETECTION OF A SUBJECT

(71) Applicant: CANON KABUSHIKI KAISHA, Tokyo (JP)

(72) Inventors: Shunsuke Chino, Saitama (JP); Toshiyuki Dobashi, Kanagawa (JP); Seiya Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/313,258

(22) Filed: May 5, 2023

(65) Prior Publication Data

US 2023/0276134 A1    Aug. 31, 2023

Related U.S. Application Data

(63) Continuation of application No. PCT/JP2021/039725, filed on Oct. 28, 2021.

(30) Foreign Application Priority Data

Nov. 9, 2020    (JP) ................................. 2020-186565

(51) Int. Cl.
*H04N 23/73*   (2023.01)
*G06T 7/70*    (2017.01)
*G06V 10/60*   (2022.01)
*G06V 10/74*   (2022.01)
*G06V 40/16*   (2022.01)

(52) U.S. Cl.
CPC ............... *H04N 23/73* (2023.01); *G06T 7/70* (2017.01); *G06V 10/60* (2022.01); *G06V 10/761* (2022.01);
(Continued)

(58) Field of Classification Search
CPC ...... H04N 23/73; H04N 23/70; H04N 23/661; H04N 23/611; H04N 23/71; H04N 23/72;
(Continued)

(56) References Cited

U.S. PATENT DOCUMENTS

2007/0147701 A1*   6/2007   Tanaka ................... H04N 23/71
                                                        348/E5.038
2009/0073287 A1    3/2009   Shimizu
(Continued)

FOREIGN PATENT DOCUMENTS

CN    101202841 A    6/2008
CN    101394484 A    3/2009
(Continued)

*Primary Examiner* — Padma Haliyur
(74) *Attorney, Agent, or Firm* — Canon U.S.A., Inc. IP Division

(57) ABSTRACT

An information processing apparatus includes an acquisition unit that acquires a captured image, a first detection unit that detects a subject from the image acquired by the acquisition unit, a second detection unit that detects a part of the subject from the image acquired by the acquisition unit, and a determination unit that determines exposure based on a luminance of the subject detected by the first detection unit to decrease a difference between the luminance of the subject and a first luminance which is a target luminance of the subject, and subsequently determines exposure based on a luminance of the part of the subject detected by the second detection unit to decrease a difference between the luminance of the part of the subject and a second luminance which is a target luminance of the part of the subject, the second luminance being different from the first luminance.

16 Claims, 10 Drawing Sheets

(52) U.S. Cl.
CPC .. *G06V 40/161* (2022.01); *G06T 2207/10144* (2013.01); *G06T 2207/30201* (2013.01); *G06V 2201/07* (2022.01)

(58) Field of Classification Search
CPC ............. G06T 7/70; G06T 2207/10144; G06T 2207/30201; G06V 10/60; G06V 10/761; G06V 40/161; G06V 2201/07; G06V 40/166

See application file for complete search history.

(56) References Cited

U.S. PATENT DOCUMENTS

2014/0176789 A1* 6/2014 Kubota .................. H04N 23/71
                                                          348/362
2015/0125032 A1* 5/2015 Yamanaka ........... G06V 40/103
                                                          382/103
2016/0205307 A1* 7/2016 Kosaka ................ G06V 40/166
                                                          348/362
2019/0082092 A1* 3/2019 Ono ..................... H04N 23/741
2019/0394377 A1* 12/2019 Zama ..................... H04N 23/75
2020/0137281 A1* 4/2020 Omori .................. H04N 23/611

FOREIGN PATENT DOCUMENTS

| CN | 103037167 A | 4/2013 |
| CN | 111107276 A | 5/2020 |
| JP | 2003046848 A | 2/2003 |
| JP | 2007228201 A | 9/2007 |
| JP | 2009071772 A | 4/2009 |
| JP | 5386793 B2 | 1/2014 |
| JP | 2015130615 A | 7/2015 |

* cited by examiner

INFORMATION PROCESSING APPARATUS, IMAGING APPARATUS, METHOD, AND STORAGE MEDIUM FOR DETERMINING EXPOSURE APPROPRIATE FOR PARTIAL DETECTION OF A SUBJECT

CROSS-REFERENCE TO RELATED APPLICATIONS

This application is a Continuation of International Patent Application No. PCT/JP2021/039725, filed Oct. 28, 2021, which claims the benefit of Japanese Patent Application No. 2020-186565, filed Nov. 9, 2020, both of which are hereby incorporated by reference herein in their entirety.

BACKGROUND OF THE INVENTION

Field of the Invention

The present invention relates to an information processing apparatus, an imaging apparatus, a method, and a storage medium.

Background Art

There is known a conventional technique of making exposure for a human body region appropriate in a case where the human body region is detected from a captured image, and making exposure for a face region appropriate in a case where the face region is detected (see PTL 1).

CITATION LIST

Patent Literature

PTL 1: Japanese Patent Application Laid-Open No. 2015-130615

An issue to be solved by the present invention is to determine exposure suitable for partial detection of a subject.

SUMMARY OF THE INVENTION

In order to achieve the above-described object, an information processing apparatus according to an aspect of the present invention includes an acquisition unit that acquires a captured image, a first detection unit that detects a subject from the image acquired by the acquisition unit, a second detection unit that detects a part of the subject from the image acquired by the acquisition unit, and a determination unit that determines exposure based on a luminance of the subject detected by the first detection unit to decrease a difference between the luminance of the subject and a first luminance which is a target luminance of the subject, and subsequently determines exposure based on a luminance of the part of the subject detected by the second detection unit to decrease a difference between the luminance of the part of the subject and a second luminance which is a target luminance of the part of the subject, the second luminance being different from the first luminance.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings. The following exemplary embodiments do not limit the present invention, and not all the combinations of features described in the present exemplary embodiments are necessarily essential to a solution of the present invention. The configurations of the exemplary embodiments can be appropriately modified or changed depending on the specifications and various conditions (such as use condition and use environment) of an apparatus to which the present invention is applied. The technical scope of the present invention is determined by the scope of claims, and is not limited by the following individual exemplary embodiments. In addition, configurations may be provided by appropriately combining parts of the exemplary embodiments to be described below.

One or more functional blocks illustrated in figures to be described below may be implemented by hardware such as an application specific integrated circuit (ASIC) or a programmable logic array (PLA), or may be implemented by a programmable processor such as a central processing unit (CPU) or a micro-processing unit (MPU) running software. The one or more functional blocks may also be implemented by a combination of software and hardware. Thus, different functional blocks to be described below as operation performers can be implemented by the same hardware as a performer. ASIC stands for "application specific integrated circuit". CPU stands for "central processing unit". MPU stands for "micro-processing unit".

First Exemplary Embodiment

A first exemplary embodiment will be described with reference to FIG. 1 to FIG. 10.
(Basic Configuration)

Figure 1:
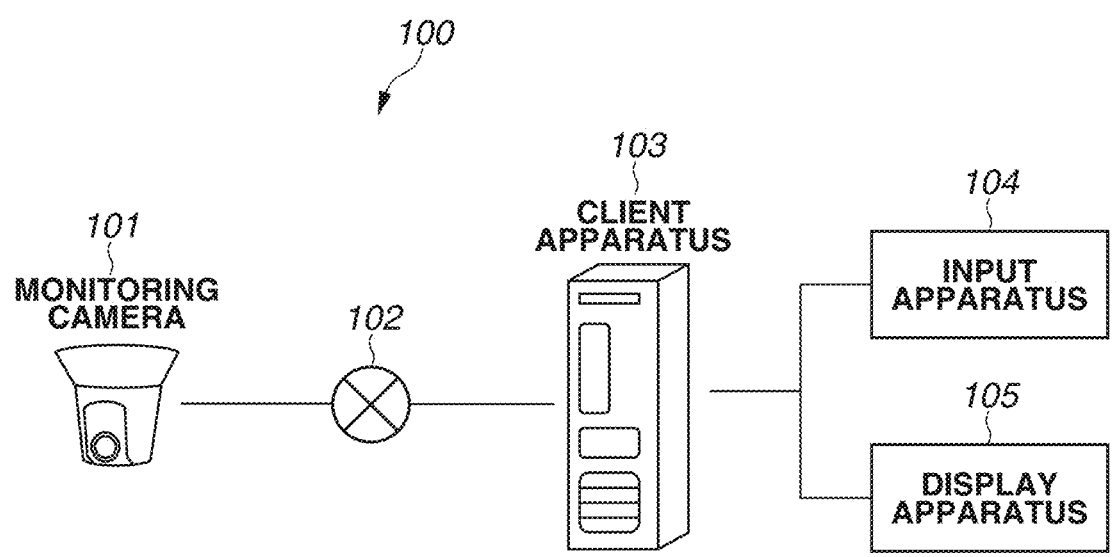
FIG. 1 is a diagram illustrating a configuration of an imaging control system according to a first exemplary embodiment.

FIG. 1 is a diagram illustrating a configuration of an imaging control system 100 according to the first exemplary embodiment of the present invention.

The imaging control system 100 includes a monitoring camera 101, a network 102, a client apparatus 103, an input apparatus 104, and a display apparatus 105. The monitoring camera 101 is an imaging apparatus for acquiring a moving image, and is an apparatus that can perform imaging of a subject and image processing. The monitoring camera 101 and the client apparatus 103 are connected in a state of being able to communicate with each other through the network 102. The client apparatus 103 is connected to the input apparatus 104 and the display apparatus 105 in a state of being able to communicate with these apparatuses. The client apparatus 103 is an apparatus that processes various kinds of information, and thus may also be referred to as an information processing apparatus. In addition, the client apparatus 103 is an apparatus that controls imaging of the monitoring camera 101, and thus may also be referred to as an imaging control apparatus.

The input apparatus 104 is composed of a mouse, a keyboard, and the like, and operated by a user of the client apparatus 103.

The display apparatus 105 is an apparatus with a monitor or the like that displays an image received from the client apparatus 103. The display apparatus 105 can also function as a user interface (UI) such as a touch panel. In this case, the display apparatus 105 can also function as an input apparatus for inputting instructions, information, data, and the like into the client apparatus 103. UI stands for "user interface"

In FIG. 1, the client apparatus 103, the input apparatus 104, and the display apparatus 105 are each illustrated as an independent apparatus, but the present exemplary embodiment is not limited to such a configuration. For example, the client apparatus 103 and the display apparatus 105 may be integrated into one apparatus, or the input apparatus 104 and the display apparatus 105 may be integrated into one apparatus. Further, the client apparatus 103, the input apparatus 104, and the display apparatus 105 may be integrated into one apparatus. In a case where the client apparatus 103 and the display apparatus 105 are integrated into one apparatus, the one apparatus takes a form of, for example, a personal computer, a tablet terminal, or a smartphone.

(Structure of Monitoring Camera)

Figure 2:
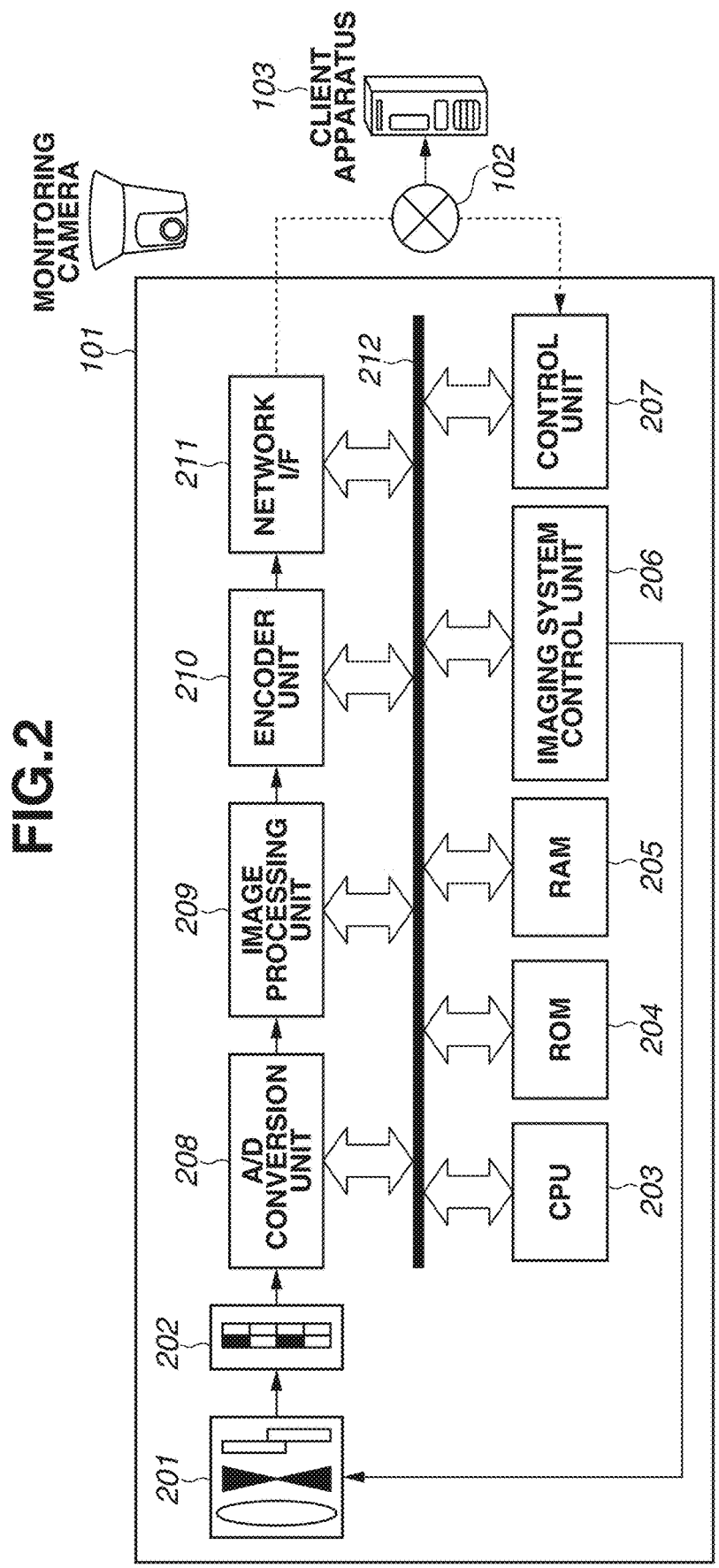
FIG. 2 is a diagram illustrating an internal configuration of a monitoring camera according to the first exemplary embodiment.

FIG. 2 is a block diagram illustrating an internal configuration of the monitoring camera 101. The monitoring camera 101 includes an imaging optical system 201, an image sensor 202, a camera CPU 203, a read only memory (ROM) 204, a random access memory (RAM) 205, an imaging system control unit 206, a communication control unit 207, an analog/digital (A/D) conversion unit 208, an image processing unit 209, an encoder unit 210, and a network interface (I/F) 211. The components 203 to 211 of the monitoring camera 101 are interconnected by a system bus 212. ROM stands for "read only memory". RAM stands for "random access memory". A/D stands for "analog/digital". I/F stands for "interface".

The imaging optical system 201 includes a zoom lens, a focus lens, a blur correction lens, a diaphragm, and a shutter, and is an optical member unit that collects optical information about the subject. The imaging optical system 201 is connected to the image sensor 202.

The image sensor 202 is a charge-storage type solid-state image sensor, such as a complementary metal-oxide semiconductor (CMOS) image sensor or a charge-coupled device (CCD) image sensor, which converts an optical flux collected by the imaging optical system 201 into a current value (a signal value). The image sensor 202 is an imaging unit configured to acquire color information by being combined with a color filter or the like. CMOS stands for "complementary metal-oxide semiconductor". CCD stands for "charge-coupled device". The image sensor 202 is connected to the A/D conversion unit 208.

The camera CPU 203 is a control unit that comprehensively controls operations of the monitoring camera 101. The camera CPU 203 reads a command stored in the ROM 204 or the RAM 205 to perform processing based on the reading result.

The imaging system control unit 206 controls the components of the monitoring camera 101, based on an instruction from the camera CPU 203. For example, the imaging system control unit 206 performs control of the imaging optical system 201, such as focus control, shutter control, and aperture adjustment.

The communication control unit 207 performs control to transmit control commands (control signals) issued from the client apparatus 103 to the components of the monitoring camera 101, to the camera CPU 203 through communication with the client apparatus 103.

The A/D conversion unit 208 converts the light amount of the subject detected by the image sensor 202 into a digital signal (image data). The A/D conversion unit 208 transmits this digital signal to the image processing unit 209.

The image processing unit 209 performs image processing on the image data of the digital signal received from the image sensor 202. The image processing unit 209 is connected to the encoder unit 210.

The encoder unit 210 performs processing for converting the image data processed by the image processing unit 209 into a file format such as Motion JPEG, H.264, or H.265. The encoder unit 210 is connected to the network I/F 211.

The network I/F 211 is an interface used to communicate with an external apparatus such as the client apparatus 103 through the network 102, and is controlled by the communication control unit 207.

The network 102 is an internet protocol (IP) network that connects the monitoring camera 101 and the client apparatus 103. The network 102 includes a plurality of routers, switches, and cables complying with a communication standard such as the Ethernet®. In the present exemplary embodiment, the communication standard, the scale, and the configuration of the network 102 are not limited as long as the network 102 enables communication between the monitoring camera 101 and the client apparatus 103. For example, the network 102 may be the Internet, a wired local area network (LAN), a wireless LAN (WLAN), or a wide area network (WAN).

(Configuration of Client Apparatus)

Figure 3:
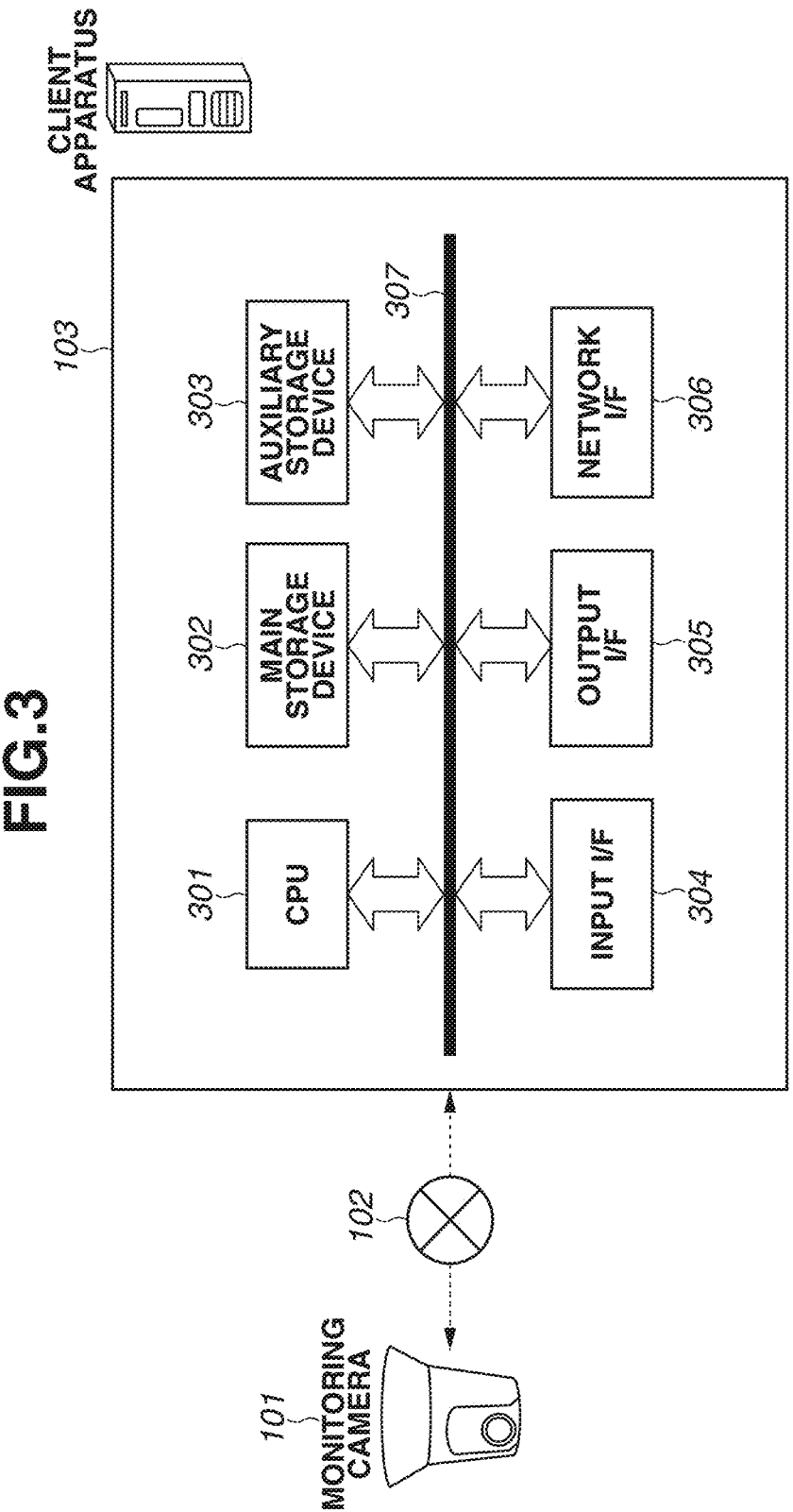
FIG. 3 is a diagram illustrating an internal configuration of a client apparatus according to the first exemplary embodiment.

FIG. 3 is a block diagram illustrating an internal configuration of the client apparatus 103.

The client apparatus 103 includes a client CPU 301, a main storage device 302, an auxiliary storage device 303, an input I/F 304, an output I/F 305, and a network I/F 306. The components of the client apparatus 103 are communicably connected through a system bus 307.

The client CPU 301 comprehensively controls operations of the client apparatus 103. The client CPU 301 may comprehensively control the monitoring camera 101 through the network 102.

The main storage device 302 is a storage device that functions as a temporary data storage area of the client CPU 301, such as a RAM. For example, the main storage device 302 stores, in advance, patterns for pattern matching (patterns corresponding to face characteristic portions and human body characteristic portions) to be used when the client apparatus 103 performs face detection or human body detection.

The auxiliary storage device 303 is a storage device such as a hard disk drive (HDD), a ROM, or a solid state drive (SSD), and stores various kinds of programs and various kinds of setting data. HDD stands for "hard disk drive". SDD stands for "solid state drive".

The input I/F 304 is used when the client apparatus 103 receives an input (a signal) from the input apparatus 104 or the like.

The output I/F 305 is used when the client apparatus 103 outputs information (a signal) to the display apparatus 105 or the like.

The network I/F 306 is used to communicate with an external apparatus such as the monitoring camera 101 through the network 102.

Figure 4:
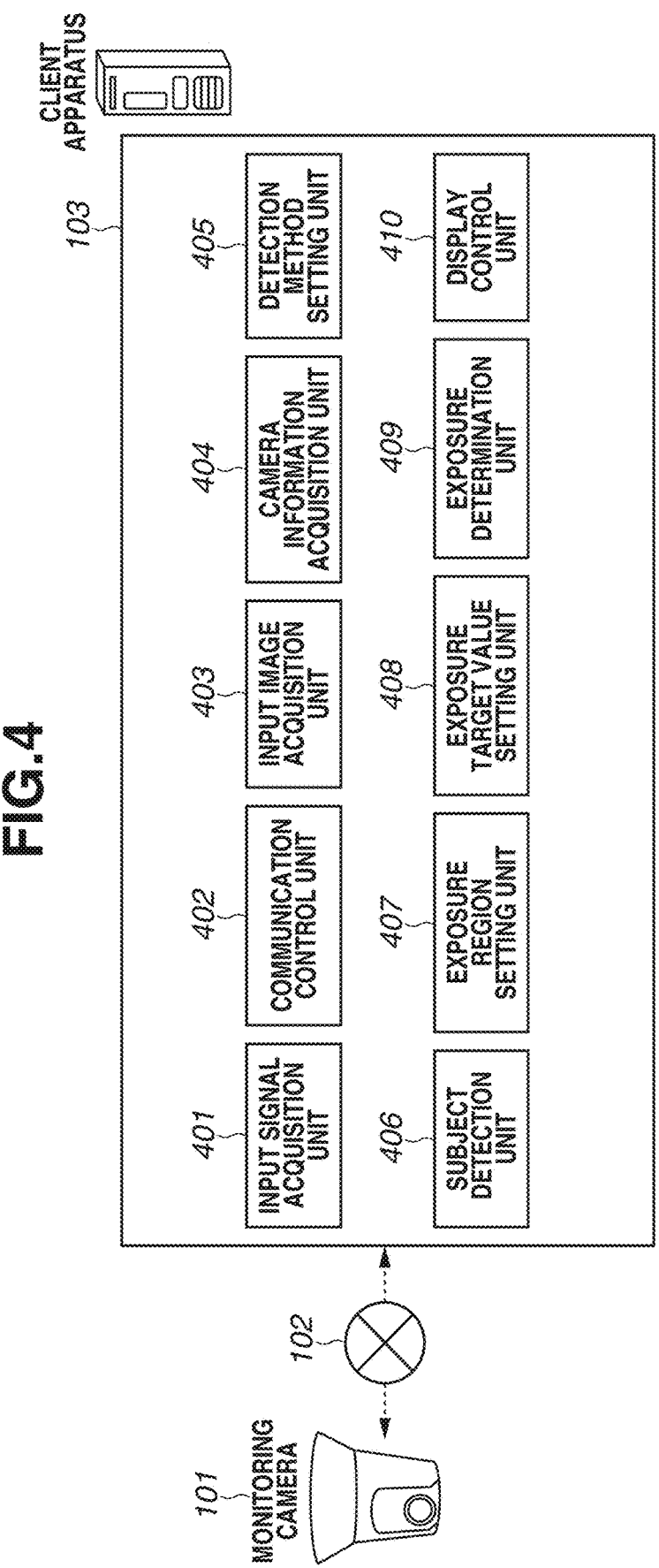
FIG. 4 is a diagram illustrating a configuration of functions performed by the client apparatus according to the first exemplary embodiment.

Functions and processing of the client apparatus 103 illustrated in FIG. 4 are implemented by the client CPU 301 performing processing based on the programs stored in the auxiliary storage device 303. The details thereof will be described below.

(Functions of Client Apparatus)

FIG. 4 illustrates the functions performed by the client apparatus 103. In other words, components (functional blocks) illustrated in FIG. 4 can be performed by the client CPU 301, and the components are synonymous with the client CPU 301.

As illustrated in FIG. 4, the client CPU 301 of the client apparatus 103 includes an input signal acquisition unit 401, a communication control unit 402, an input image acquisition unit 403, a camera information acquisition unit 404, and a detection method setting unit 405. The client CPU 301 further includes a subject detection unit 406, an exposure determination unit 409, and a display control unit 410. The client apparatus 103 may perform the functions of the units 401 to 409 illustrated in FIG. 4 by using hardware (or software) different from the client CPU 301.

The input signal acquisition unit 401 receives an input from the user through the input apparatus 104.

The communication control unit 402 performs control to receive, through the network 102, an image transmitted from the monitoring camera 101 (an image captured by the monitoring camera 101). Further, the communication control unit 402 performs control to transmit, through the network 102, control commands issued from the client apparatus 103 to the monitoring camera 101.

The input image acquisition unit 403 acquires the image received from the monitoring camera 101 through the communication control unit 402, as a target image for subject detection processing (an image to which subject detection processing is to be applied). The details of the detection processing will be described below.

The camera information acquisition unit 404 acquires camera information (imaging information) to be used when the monitoring camera 101 captures an image of a subject, through the communication control unit 402. The camera information (the imaging information) corresponds to various kinds of information to be used when the image of the subject is captured and acquired. The camera information includes exposure parameters such as an aperture value, a shutter speed, and a gain. The camera information also includes an exposure correction value for changing an exposure target value to be used in auto exposure (AE).

The detection method setting unit 405 sets a predetermined detection method (an appropriate detection method) for the image acquired by the input image acquisition unit 403, among various detection methods including face region detection (face detection) and human body region detection (human body detection). In a case where the face detection is performed, the subject detection unit 406 to be described below preferentially detects a face region in the image. In a case where the human body detection is performed, the subject detection unit 406 preferentially detects a human body region in the image. The coordinates (including the vertex coordinate, the width, and the height) of the detected face region or human body region are calculated.

In the present exemplary embodiment, the detection method setting unit 405 sets (selects) the face detection method or the human body method. The present embodiment is not limited to such setting. For example, the detection method setting unit 405 may set (be capable of selecting) a detection method that detects a partial characteristic region of a person, such as an upper half body, a head, or a partial face region such as eyes, a nose, or a mouth. Further, in the present embodiment, while the subject to be detected is a person, a specific region related to a predetermined subject other than a person may be detected. For example, a predetermined subject preset in the client apparatus 103, such as the face of an animal or an automobile, may be detected.

An exposure region setting unit 407 sets an exposure region to be used in AE, based on the face region or the human body region calculated by the detection method setting unit 405.

Figure 5:
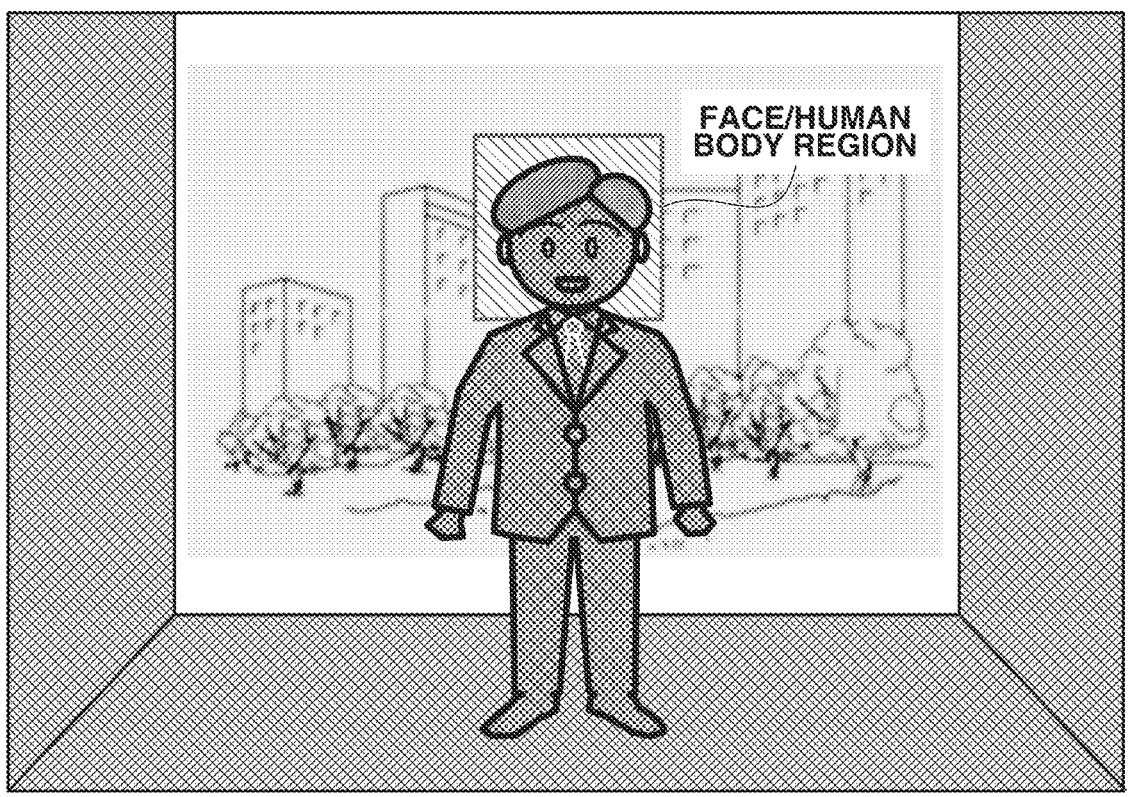
FIG. 5 is a diagram illustrating a captured image in which a face/human body region has underexposure, according to the first exemplary embodiment.
Figure 6:
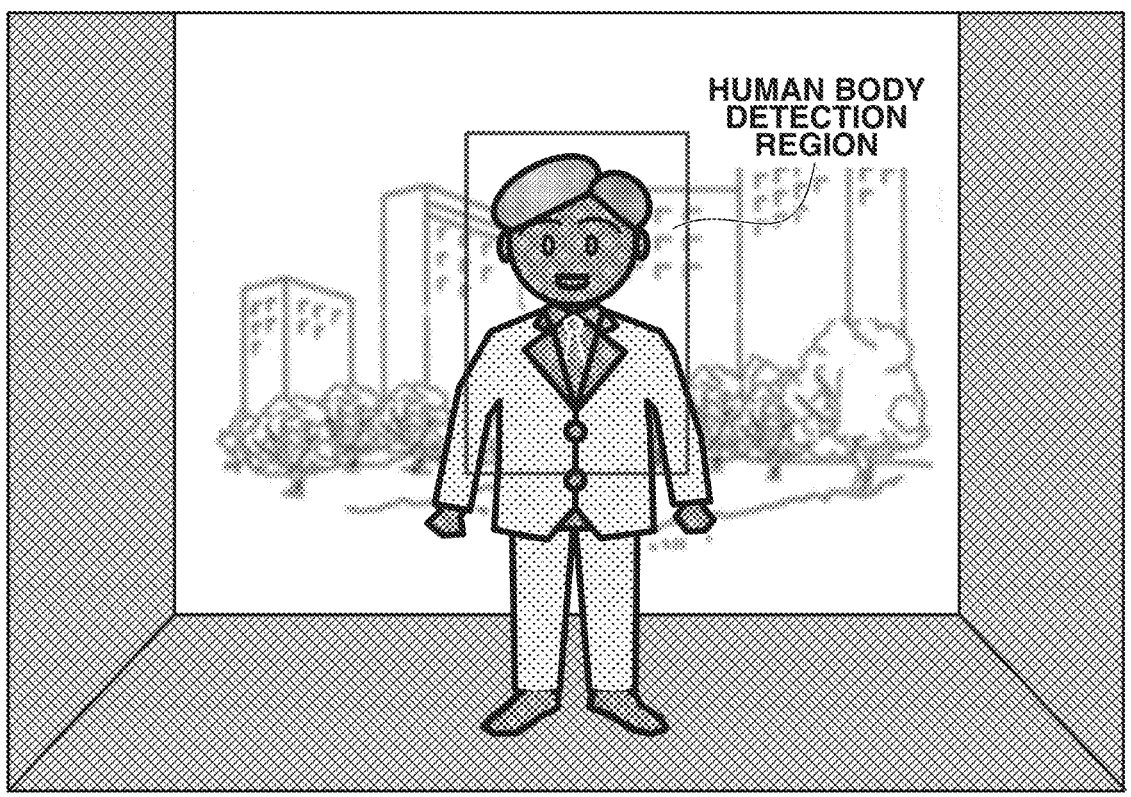
FIG. 6 is a diagram illustrating a captured image in which a face has underexposure, according to the first exemplary embodiment.
Figure 7:
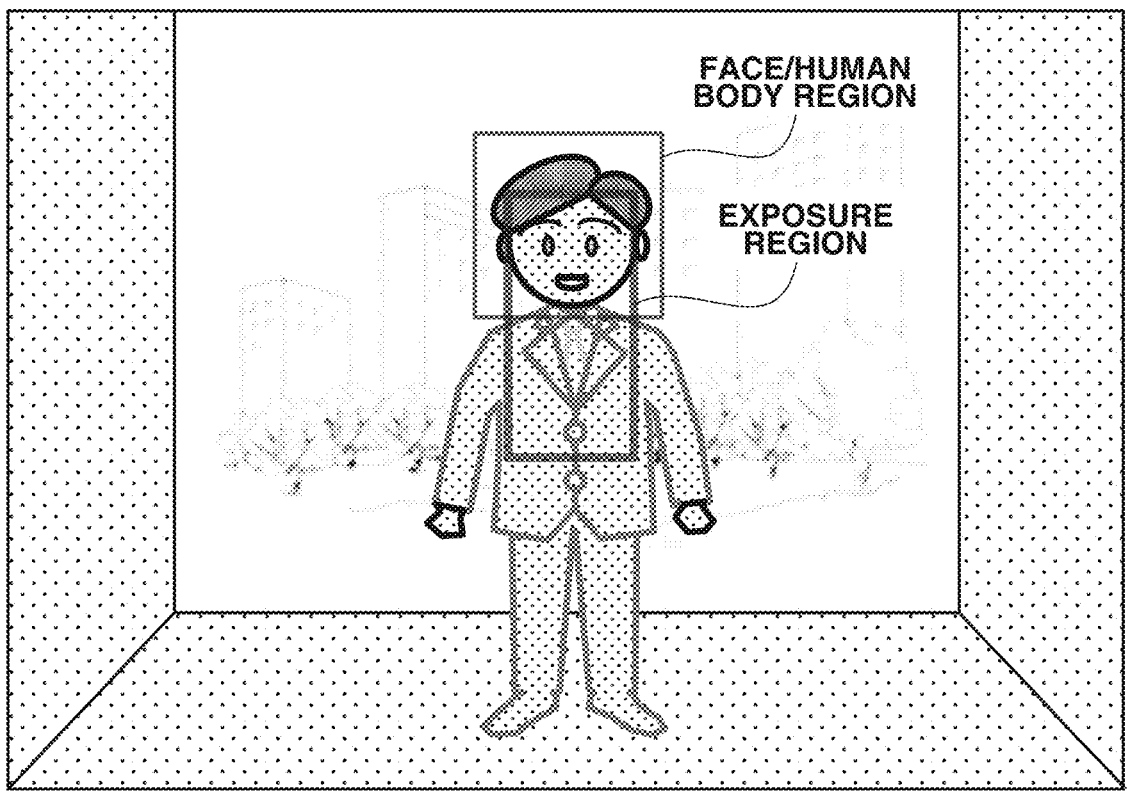
FIG. 7 is a diagram illustrating a captured image in which a face is appropriate and a background has overexposure, according to the first exemplary embodiment.

An exposure target value setting unit 408 sets a suitable exposure target value, based on the detection method set by the detection method setting unit 405. For example, an exposure target value suitable for face is set in a case where a face is detected by the detection method, and an exposure target value suitable for human body is set in a case where a human body is detected by the detection method. FIG. 5 illustrates a scene of backlight. The exposure is optimized for a background, so that a human body region and a face region have underexposure. In such a case, a human body that can be determined from a silhouette is detected, and exposure is performed based on the detected human body, and when a face region can be detected as a result of increasing the exposure, exposure is performed based on the detected face region. In a case where worn clothes are bright as in FIG. 6, the exposure for the face region is not sufficiently increased even if the exposure is adjusted for the human body region, and thus the face region cannot be detected. Therefore, in a scene for which correction is performed to increase the exposure as in FIG. 5, a high exposure target value for the human body region may be set. The human body portion has slight overexposure as illustrated in FIG. 7, but the face region can be detected, and the exposure can be appropriately adjusted for the face region. In a case where control is performed such that the exposure is adjusted for a certain subject and subsequently adjusted for a different subject, an exposure target value that passes through an appropriate region of the different subject as much as possible is applied to the certain subject, and such a value is useful. For example, a case where an adequate adjustment is made from the human body region to the face region as in FIGS. 5 to 7 will be described. The exposure is adjusted for a human body that can be easily detected from a silhouette, and an exposure target value for a human body region to pass through appropriate exposure for a face region is set when controlling the exposure for the human body region, so that the face region can be more likely to be detected.

Figure 8:
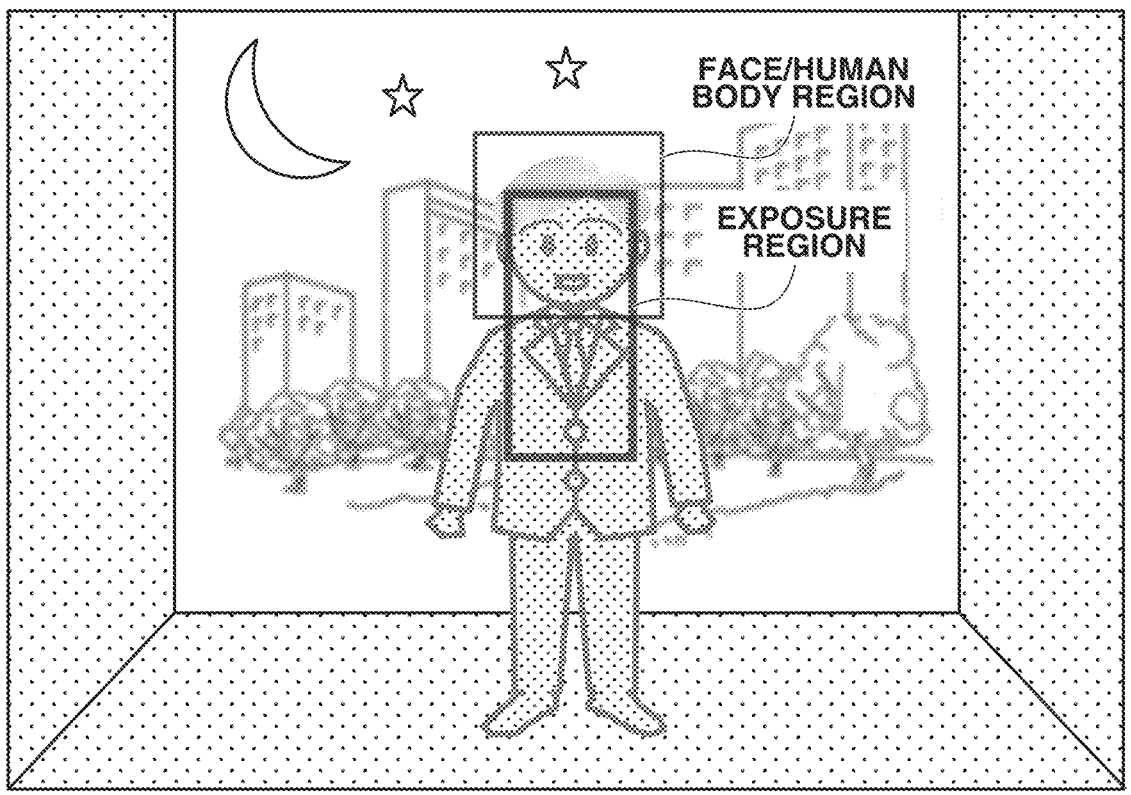
FIG. 8 is a diagram illustrating a captured image in which a face/human body region has overexposure, according to the first exemplary embodiment.
Figure 9:
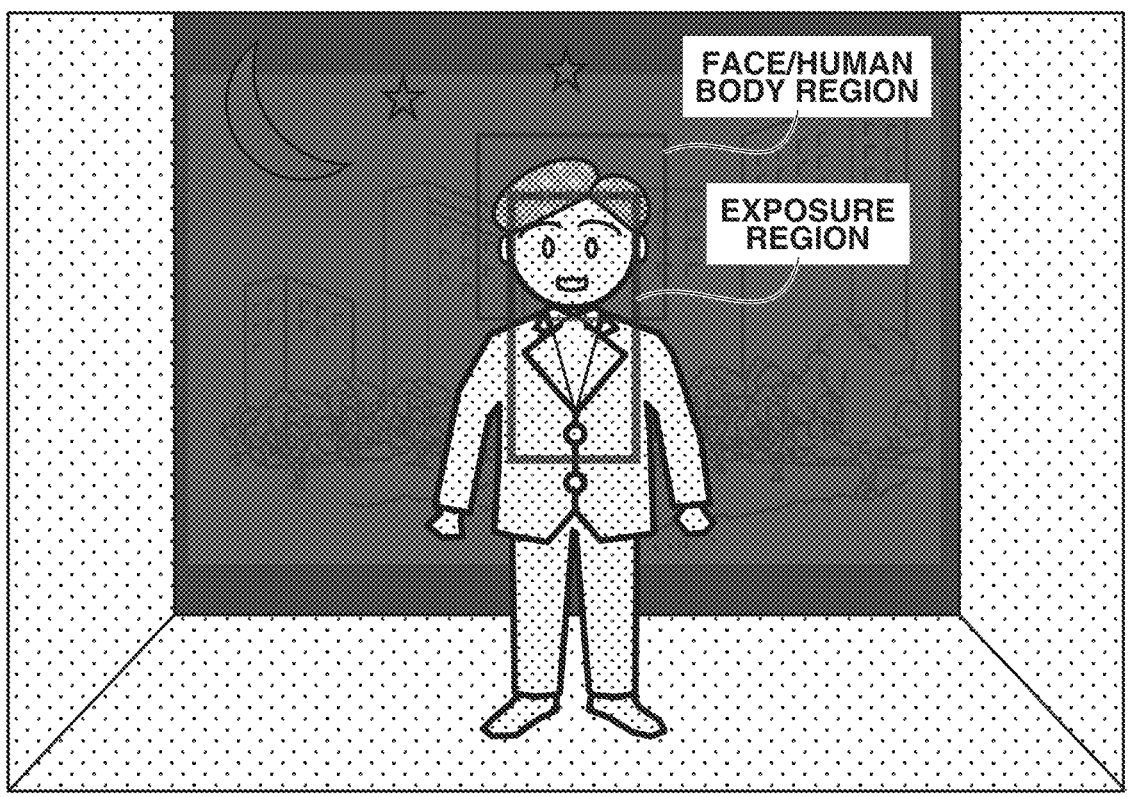
FIG. 9 is a diagram illustrating a captured image in which a face/human body region is appropriate, according to the first exemplary embodiment.

FIG. 8 illustrates a scene where a person stands in a room with a night view as a background. In the scene in FIG. 8, the exposure is optimized for a night view portion of the background, and a person has overexposure. In such a case, control is performed to reduce the exposure for both of a human body region and a face region. In a scene for which correction is performed to reduce the exposure, a low exposure target value for the human body region may be set relative to a target value for the face region. The background has underexposure as illustrated FIG. 9, but the face region can be detected, and the exposure can be appropriately adjusted for the face region.

The present exemplary embodiment has been described using the human body region and the face region, but the present exemplary embodiment is not limited to such setting. For example, a detection method that detects a partial characteristic region of a person, such as an upper half body, a head, or a partial face region such as eyes, a nose, or a mouth may be set (can be selected). Furthermore, in the present embodiment, while the subject to be detected is a person, a specific region related to a predetermined subject other than a person may be detected. For example, a predetermined subject preset in the client apparatus 103, such as the face of an animal, an automobile, or a vehicle registration plate, may be detected.

The exposure determination unit 409 determines an exposure level based on image information about a subject region obtained from the subject detection unit 406, the communication control unit 402 transmits the determined exposure level to the monitoring camera 101, and the monitoring camera 101 then performs exposure control through the control unit 207. For a method of adjusting the exposure level, at least one of an aperture value, a shutter speed, a gain, and a parameter influencing exposure based on the exposure correction value can be used.

Figure 10:
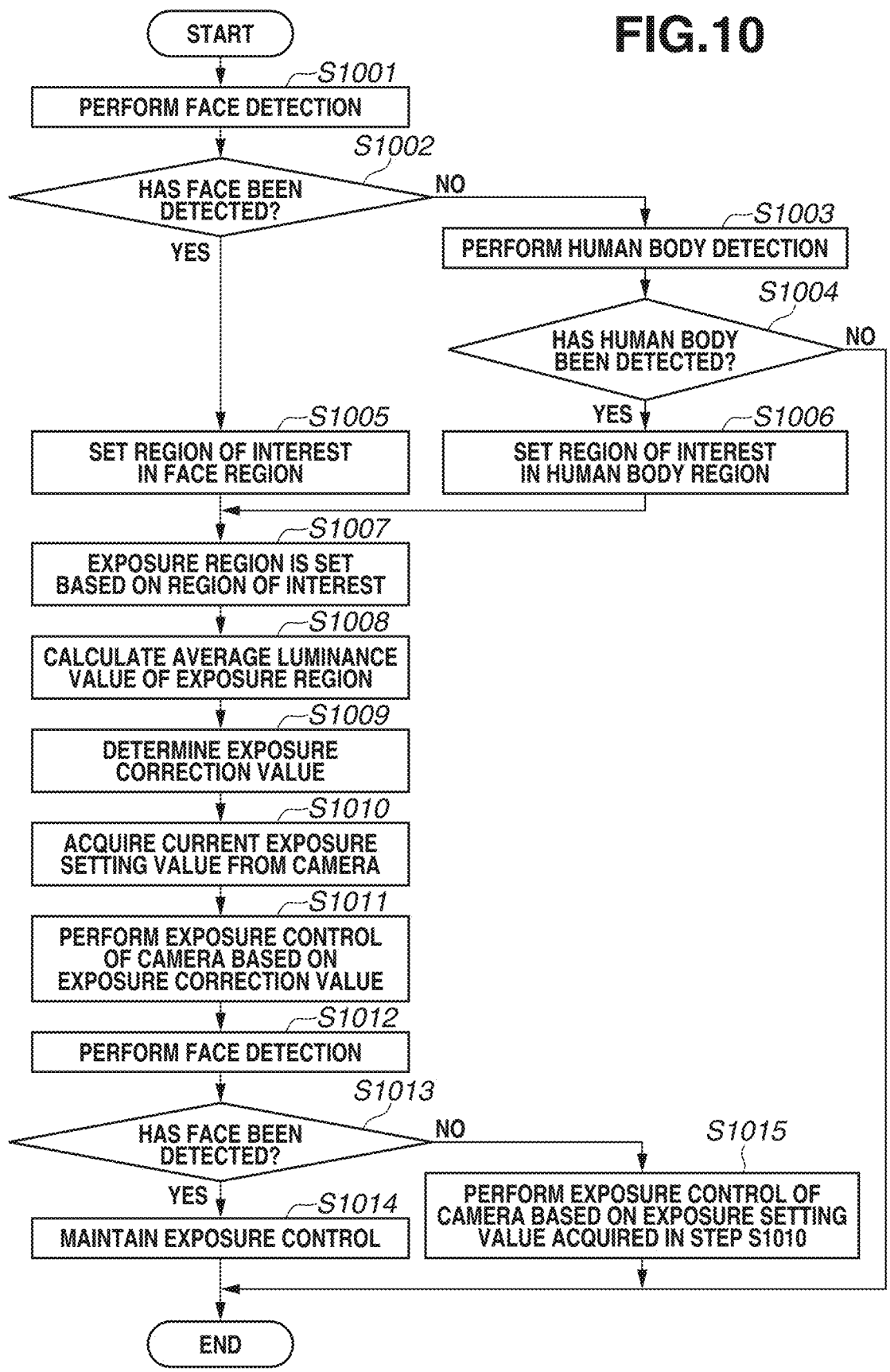
FIG. 10 is a flowchart illustrating exposure control processing according to the first exemplary embodiment.

The detailed processing flow related to the camera information acquisition unit 404, the detection method setting unit 405, the subject detection unit 406, and the exposure determination unit 409 will be described below with reference to a flowchart in FIG. 10.

The display control unit 410 outputs the captured image in which the exposure correction determined by the exposure determination unit 409 is reflected, to the display apparatus 105 in response to an instruction from the CPU 301.

(Subject Detection Processing and Exposure Determination Processing)

Exposure control processing according to the present embodiment will be described with reference to the flowchart in FIG. 10. In the imaging control system 100 illustrated in FIG. 1, it is assumed that the monitoring camera 101, the client apparatus 103, the input apparatus 104, and the display apparatus 105 are turned on, and connection (communication) is established between the monitoring camera 101 and the client apparatus 103. It is also assumed in this state that the capturing of the image of the subject by the monitoring camera 101, the transmission of the image data from the monitoring camera 101 to the client apparatus 103, and the display of the image on the display apparatus 105 are repeated at a predetermined update period. It is further assumed that the processing in the flowchart in FIG. 10 is started by the client CPU 301 in response to input of the captured image of the subject from the monitoring camera 101 to the client apparatus 103 through the network 102.

First, in step S1001, the detection method setting unit 405 sets the face detection in the subject detection unit 406, and the subject detection unit 406 performs face detection processing on the input image. The main storage device 302 of the client apparatus 103 stores, in advance, the patterns corresponding to face characteristic portions and the patterns corresponding to human body characteristic portions, and the subject detection unit 406 detects a face region through pattern matching based on the patterns.

Next, in step S1002, the subject detection unit 406 determines whether a face region has been detected in the image, in the face detection processing performed in step S1001. The processing proceeds to step S1003 in a case where a face region has not been detected, whereas the processing proceeds to step S1005 in a case where at least one face region has been detected.

In step S1003, the detection method setting unit 405 sets the human body detection in the subject detection unit 406, and the subject detection unit 406 performs human body detection processing on the input image. Typically, in a case where a face region is detected, a face can be detected with high accuracy, and the face region of the subject and regions other than the face region are clearly distinguishable. However, if the direction, size, brightness, and the like of the face do not satisfy conditions suitable for the face detection, the face region cannot be accurately detected. In contrast, in a case where a human body is detected, a region where a person is present can be detected irrespective of the direction, the size, the brightness, and the like of the face. In the human body detection according to the present embodiment, a whole body may not necessarily be detected, and an upper half body, a body part above the chest, or a head region including a face may be detected. FIG. 7 illustrates a detection example of a face region and a human body region.

In a case where a pattern matching method is adopted as the subject detection method, patterns (classifiers) generated using statistical learning may be used as the patterns for pattern matching. Alternatively, the subject may be detected using a method other than the pattern matching method. For example, the subject may be detected by using a luminance gradient in a local region. In other words, the subject detection method is not limited to a specific detection method, and various methods such as a detection method based on machine learning and a detection method based on distance information can be adopted.

In step S1004, the subject detection unit 406 determines whether a human body region has been detected in the image, in the human body detection processing performed in step S1003. The processing ends in a case where a human body has not been detected, whereas the processing proceeds to step S1006 in a case where a human body has been detected.

In step S1005, the exposure region setting unit 407 sets a region of interest to be used in subsequent step S1008, in the face region detected in step S1001.

In step S1006, the exposure region setting unit 407 sets a region of interest to be used in subsequent step S1008, in the human body region detected in step S1003.

In step S1007, an exposure region is set based on the set region of interest.

In step S1008, the exposure determination unit 409 calculates an average luminance value of the exposure region set in step S1007. Specifically, information about the number of regions of interest (the number of the detected faces or human bodies) set in step S1005 or step S1006, the position of the region of interest and the size of the region of interest are applied to the following equation (1) by the exposure determination unit 409.

[Equation 1]

$$\overline{I}_{object} = \frac{1}{f}\sum_{s=1}^{f}\left\{\frac{1}{k_s \times l_s}\sum_{i=-k_s/2}^{k_s/2}\sum_{j=-l_s/2}^{l_s/2} I(v_s+i, h_s+j)\right\} \quad (1)$$

Here, I(x, y) represents a luminance value at a two-dimensional coordinate position (x, y) in a horizontal direction (an x-axis direction) and a perpendicular direction (a y-axis direction) in the image. In addition, f represents the number of regions of interest, (v, h) represents the center coordinates of the region of interest, k represents the size of the region of interest in the horizontal direction, and l represents the detected size of the region of interest in the perpendicular direction. Therefore, the average luminance value of the human body region (the subject) and the average luminance value of the face region (a part of the subject) are calculated.

In step S1009, the exposure target value setting unit 408 determines a correction amount EVcorrection for exposure, based on the average luminance value calculated in step S1008. First, the exposure determination unit 409 calculates a differential value between the average luminance value Iobject of the region of interest calculated in step S1008 and a target luminance value Iobject target of the region of interest by using an equation (2). At this point, a target luminance value Iobject target_face in the face region is set as the target luminance value Iobject target of the region of interest.

$$\Delta\text{Diff} = I_{object\ target} - \overline{I}_{object} \quad [\text{Equation 2}]$$

The target luminance value Iobject target of the region of interest is determined based on the region of interest and a correction direction. In a case where the correction direction for exposure is a direction to increase the exposure (in the case of underexposure), a higher target luminance value is set in the human body region than in the face region. In other words, the target luminance value is set to attain overexposure of the human body region. On the other hand, in a case where the correction direction for exposure is a direction to decrease the exposure (in the case of overexposure), a lower target luminance value is set in the human body region than in the face region. In other words, the target luminance value is set to attain underexposure of the human body region. Specifically, the target luminance value for the human body region is determined by the following equation (3).

[Equation 3]

$$I_{object\ target\ body} = \begin{cases} I_{object\ target\_face} - \alpha & \text{if } \Delta Diff < 0 \\ I_{object\ target\_face} + \alpha & \text{if } \Delta Diff > 0 \end{cases} \quad (3)$$

Here, Iobject target_body is a target luminance value (a first luminance) in a case where the region of interest is the human body region. Further, Iobject target_face is a target luminance value (a second luminance) in a case where the region of interest is the face region. For example, Iobject target_face is a target luminance value to attain appropriate exposure for the face region.

α is the difference between of the target luminance value in a case where exposure is performed based on the face region and the target luminance value in a case where exposure is performed based on the human body region. A predetermined value by which a face can be detected even if an exposure value in the human body region is shifted in the face region because of worn clothes and the like may be set. The probability that the face can be detected increases greatly in a case where the difference between the first luminance and the second luminance is about 10% of the second luminance. In other words, in a case where the correction direction for exposure is the direction to increase the exposure, it is desirable to set the target luminance value of the human body region to a value of about 110% of the target luminance value of the face region, and in a case where the correction direction for exposure is a direction to decrease the exposure, it is desirable to set the target luminance value of the human body region to a value of about 90% of the target luminance value of the face region.

In addition, if a slightly larger value is set to pass through a set value that makes the face region appropriate without fail, it is possible to pass through exposure that makes the face region appropriate when exposure correction is performed for the human body.

Moreover, it is also effective to increase the value of a, in a case where the human body region is detected and the face region cannot be detected. This can increase the possibility that the face region can be detected in a case where the face cannot be detected using the exposure target value of the human body region.

In a case where the region of interest is the face region, Iobject target_face is set to Iobject target. In a case where the region of interest is the human body region image, Iobject target_body is set to Iobject target.

Again, ΔDiff is calculated using the equation (2).

Next, the exposure determination unit 409 determines the correction amount EVcorrection as expressed by the equation (4). EVcurrent is an EV value converted according to the Additive System of Photographic Exposure (APEX) based on a subject luminance value (a brightness value (BV)), and is set based on a program chart that is related to the exposure control and is stored in advance in the client apparatus 103.

[Equation 4]

$$EV_{correction} = \begin{cases} EV_{current} - \beta & \text{if } \Delta Diff < -Th \\ EV_{current} & \text{if } -Th \le \Delta Diff \le Th \\ EV_{current} + \beta & \text{if } Th < \Delta Diff \end{cases} \quad (4)$$

Here, a parameter β is a coefficient influencing a correction degree (a speed) when exposure is corrected to an underexposure side or an overexposure side with the current exposure value EVcurrent as a center. If the parameter β is set to a large value, the processing speed (the processing time) to reach the target value is faster (shorter). However, in a case where erroneous determination occurs in the detection result or in a case where subject detection is unstable, brightness of the entire screen is sharply changed. In contrast, if the parameter β is set to a small value, the processing speed (the processing time) for the exposure to reach the target value is lower (longer), but the processing is robust against erroneous detection and imaging condition. In a case where the difference ΔDiff is greater than or equal to a set threshold Th, the parameter β is set as the exposure correction value for the current exposure value EVcurrent.

In step S1010, the camera information acquisition unit 404 acquires information about the current exposure setting value from the camera. In the present exemplary embodiment, the exposure correction value is acquired.

In step S1011, the exposure determination unit 409 communicates with the monitoring camera 101 through the communication control unit 402, and performs an exposure control of the monitoring camera 101 by setting the exposure correction value calculated in step S1009 in the monitoring camera 101.

In step S1012, the subject detection unit 406 performs the face detection in a manner similar to step S1001.

In step S1013, the subject detection unit 406 determines whether a face region has been detected in the image, in the face detection processing performed in step S1012. The processing proceeds to step S1014 in a case where a face region has been detected, whereas the processing proceeds to step S1015 in a case where a face region has not been detected.

In step S1014, the exposure determination unit 409 communicates with the monitoring camera 101 through the communication control unit 402, and performs setting in the monitoring camera 101 to maintain the exposure correction value set in step S1011, and the processing ends.

In step S1015, the exposure determination unit 409 communicates with the monitoring camera 101 through the communication control unit 402, and performs the exposure control of the monitoring camera 101 by setting the exposure correction value acquired in step S1010 in the monitoring camera 101, and the processing ends.

As described above, in the imaging control system 100 of the present exemplary embodiment, an appropriate exposure region is set based on the face region or human body region, and the exposure control is performed based on the exposure region, so that a value suitable for the exposure of the face region or human body region can be set. For example, even in the case of a strong backlight state such as a store entrance using a glass door, or a stadium gate, it is possible to maintain an exposure control value appropriate for the face detection. Therefore, the face of a customer or spectator subject (a person) can be quickly captured. While some desirable exemplary embodiments of the present invention have been described, the present invention is not limited to these exemplary embodiments, and can be modified and changed in various manners within the scope of the spirit thereof.

<Other Exemplary Embodiments>

The present invention can also be implemented by processing for supplying a program for implementing one or more functions in the above-described exemplary embodiments to a system or apparatus via a network or a storage medium and causing one or more processors in a computer of the system or apparatus to read and execute the program. The present invention can also be implemented by a circuit (e.g., an ASIC) that implements the one or more functions.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Exposure control suitable for partial detection of a subject can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
at least one processor, a memory coupled to the at least one processor, the memory storing instructions that, when executed by the processor, cause the processor to function as:
an acquisition unit configured to acquire a captured image;
a first detection unit configured to detect a subject from the image acquired by the acquisition unit;
a second detection unit configured to detect a part of the subject from an image acquired by the acquisition unit; and
a determination unit configured to determine exposure based on a luminance of the subject detected by the first detection unit to decrease a difference between the luminance of the subject and a first luminance which is a target luminance of the subject, and subsequently determine exposure based on a luminance of the part of the subject detected by the second detection unit under the exposure determined based on the luminance of the subject detected by the first detection unit to decrease a difference between the luminance of the part of the subject and a second luminance which is a target luminance of the part of the subject, the second luminance being different from the first luminance, wherein the determination unit increases a difference between the first luminance and the second luminance, in a case where the part of the subject is not detected by the second detection unit from an image captured based on the exposure determined for the subject.

2. The information processing apparatus according to claim 1, wherein the determination unit sets the first luminance to a luminance higher than the second luminance in a case where the luminance of the subject is lower than the second luminance, whereas the determination unit sets the first luminance to a luminance lower than the second luminance in a case where the luminance of the subject is higher than the second luminance.

3. The information processing apparatus according to claim 1, wherein the second luminance is a luminance for appropriate exposure of the part of the subject, and the first luminance is a luminance for overexposure or underexposure of the subject.

4. The information processing apparatus according to claim 1, wherein in the determination unit, a difference between the first luminance and the second luminance is about 10% of the first luminance.

5. The information processing apparatus according to claim 1, wherein the luminance of the subject is an average luminance value of the subject, and the luminance of the part of the subject is an average luminance value of the part of the subject.

6. The information processing apparatus according to claim 1, wherein the determination unit determines exposure for the part of the subject, in a case where the part of the subject is detected by the second detection unit from an image captured based on the exposure determined for the subject.

7. The information processing apparatus according to claim 1, wherein the subject detected by the first detection unit is a human body region, and the part of the subject detected by the second detection unit is a face region.

8. An imaging apparatus comprising the information processing apparatus according to claim 1.

9. A method of determining exposure of an image, the method comprising:
acquiring a captured image;
performing first detection of detecting a subject from the acquired image;
determining exposure based on a luminance of the detected subject to decrease a difference between the luminance of the subject and a first luminance which is a target luminance of the subject;
performing second detection of detecting a part of the subject from an image acquired under the determined exposure; and
determining exposure for the part of the subject to decrease a difference between a luminance of the part of the subject and a second luminance different from the first luminance, wherein in the determining, a difference between the first luminance and the second luminance is increased in a case where the part of the subject is not detected in the second detection from an image captured based on the exposure determined for the subject.

10. The method according to claim 9, wherein in the determining, the first luminance is set to a luminance higher than the second luminance in a case where the luminance of the subject is lower than the second luminance, whereas the first luminance is set to a luminance lower than the second luminance in a case where the luminance of the subject is higher than the second luminance.

11. The method according to claim 9, wherein the second luminance is a luminance for appropriate exposure of the part of the subject, and the first luminance is a luminance for overexposure or underexposure of the subject.

12. The method according to claim 9, wherein in the determining, a difference between the first luminance and the second luminance is about 10% of the first luminance.

13. The method according to claim 9, wherein the luminance of the subject is an average luminance value of the subject, and the luminance of the part of the subject is an average luminance value of the part of the subject.

14. The method according to claim 9, wherein in the determining, exposure for the part of the subject is determined, in a case where the part of the subject is detected in the second detection from an image captured based on the exposure determined for the subject.

15. The method according to claim 9, wherein the subject detected in the first detection is a human body region, and the part of the subject in the second detection is a face region.

16. A computer-readable storage medium that stores a program for causing a computer to execute the method according to claim 9.

* * * * *